US011460655B2

(12) United States Patent
Corbille et al.

(10) Patent No.: US 11,460,655 B2
(45) Date of Patent: Oct. 4, 2022

(54) CABLE ENTRY SEALING SYSTEMS FOR TELECOMMUNICATION ENCLOSURES

(71) Applicant: Corning Research & Development Corporation, Corning, NY (US)

(72) Inventors: Christophe Joseph Marie Corbille, Saint Nicolas de Redon (FR); Michel Teva Menguy, La Chevallerais (FR)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/107,798

(22) Filed: Nov. 30, 2020

(65) Prior Publication Data
US 2021/0255408 A1 Aug. 19, 2021

Related U.S. Application Data

(60) Provisional application No. 62/977,318, filed on Feb. 16, 2020.

(51) Int. Cl.
*G02B 6/44* (2006.01)
*G02B 6/38* (2006.01)
*H02G 15/013* (2006.01)

(52) U.S. Cl.
CPC .......... *G02B 6/4444* (2013.01); *G02B 6/389* (2013.01); *G02B 6/3858* (2013.01);
(Continued)

(58) Field of Classification Search
None
See application file for complete search history.

(56) References Cited

U.S. PATENT DOCUMENTS 6,875,926 B2 * 4/2005 Buekers ............... G02B 6/4444
174/100
9,229,186 B2 * 1/2016 Allen .................. G02B 6/4444
(Continued)

FOREIGN PATENT DOCUMENTS

AU 2014216341 C1 * 7/2018 .......... G02B 6/4444
CN 104659729 A 5/2015
(Continued)

OTHER PUBLICATIONS

European Patent Application No. 21156941.3, Extended European Search Report dated Jul. 8, 2021; 9 pages; European Patent Office.

*Primary Examiner* — Michelle R Connelly
(74) *Attorney, Agent, or Firm* — Tamika A. Crawl-Bey

(57) ABSTRACT

A cable entry sealing system includes a housing having a first housing end and a second housing end; a sealing and shielding member having a portion insertable into the housing, the sealing and shielding member comprising: a plug portion and a medial sealing portion, extending from the plug portion. The medial sealing portion includes a first raised edge, a lip sealing portion extending outwardly from the first raised edge, and a medial body section having a second raised edge. The system further includes an end sealing portion, extending from the medial portion, and at least one compression member coupled to the end sealing portion. The sealing and shielding member is configured to prevent contamination into the cable entry sealing system and distortion of the at least one compression member.

8 Claims, 10 Drawing Sheets

(52) U.S. Cl.
CPC ......... *G02B 6/4454* (2013.01); *H02G 15/013* (2013.01); *G02B 6/4471* (2013.01)

(56) References Cited

U.S. PATENT DOCUMENTS

| | | | | |
|---|---|---|---|---|
| 9,244,238 B2 * | 1/2016 | Claessens | ................ | G02B 6/46 |
| 2007/0025677 A1 * | 2/2007 | Harrison | .............. | G02B 6/4471 |
| | | | | 385/138 |
| 2011/0033157 A1 * | 2/2011 | Drouard | ............... | G02B 6/4477 |
| | | | | 385/77 |

FOREIGN PATENT DOCUMENTS

| | | | | | |
|---|---|---|---|---|---|
| DE | 4325138 | A1 | | 2/1995 | |
| EP | 0978745 | A1 | | 2/2000 | |
| EP | 2277241 | A1 | | 1/2011 | |
| EP | 2452404 | B1 | * | 7/2016 | ........... H02G 15/013 |
| EP | 3674764 | A1 | * | 7/2020 | ........... G02B 6/4444 |
| JP | H09510077 | A | * | 10/1997 | ........... H02G 15/013 |
| WO | 2007/014385 | A2 | | 2/2007 | |
| WO | 2009/126411 | A1 | | 10/2009 | |

\* cited by examiner

CABLE ENTRY SEALING SYSTEMS FOR TELECOMMUNICATION ENCLOSURES

CROSS-REFERENCE TO RELATED APPLICATIONS

This application claims priority to U.S. Application No. 62/977,318, filed Feb. 16, 2020, the contents of which are incorporated herein by reference in its entirety.

BACKGROUND

The present disclosure generally relates to cable entry sealing systems for telecommunication enclosures, which house telecommunication cables and other communications equipment, and methods of pre-installing, disassembling, and reinstalling cable entry sealing systems onto telecommunication enclosures.

Telecommunications closures for housing communications equipment are deployed at various points along the distribution network. Telecommunications closures can be positioned at various locations such as aerially from a utility pole, above ground on a pedestal, or below ground in a below grade closure. One example of a telecommunications closure is a splice closure configured to be positioned below ground. Conventional splice closures include components such as splice trays and/or slack hubs to facilitate the splicing of one or more fiber optic cables. Such splice closures are preferably watertight to prevent any degradation of the fibers and/or splices due to the ingress of water and other elements.

Telecommunications closures typically include one or more openings defined in the closure to allow the cables, which are connected, stored, and/or otherwise present within the closure, to enter and exit the closure. Preferably, the closure provides a generally sealed environment to protect the connectors, cables, and other hardware stored within the closure from water, dirt, moisture, infestation, or the like. Conventional closures typically include grommets that are interchangeable and that provide a variety of openings through which one or more cables may pass into the closure. To run a cable into a closure, a field technician typically removes a plug device (such as a grommet with no openings), selects a grommet with one or more openings suitable for the cable to pass through, positions the cable through the grommet, and then places the grommet into the opening of the closure. One shortfall of this approach is that the grommet openings may not always be optimally sized to seal the cable.

In view of the aforementioned needs as well as other issues with prior designs, alternatives are desired.

SUMMARY

Disclosed herein are embodiments of cable entry sealing systems for telecommunication enclosures, which house telecommunication cables and other communications equipment, and methods of preinstalling, disassembling, and reinstalling cable entry sealing systems onto telecommunication enclosures.

According to a first aspect, a cable entry sealing system includes a housing having a first housing end and a second housing end; a sealing and shielding member having a portion insertable into the housing, the sealing and shielding member comprising: a plug portion, a medial sealing portion, extending from the plug portion. The medial sealing portion includes a first raised edge, a lip sealing portion extending outwardly from the first raised edge, and a medial body section having a second raised edge. The system further includes an end sealing portion, extending from the medial portion, and at least one compression member coupled to the end sealing portion, wherein the sealing and shielding member prevents contamination into the cable entry sealing system and distortion of the at least one compression member.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The figures are not necessarily to scale. Like numbers used in the figures may be used to refer to like components. However, it will be understood that the use of a number to refer to a component in a given figure is not intended to limit the component in another figure labeled with the same number.

DETAILED DESCRIPTION

Figure 1:
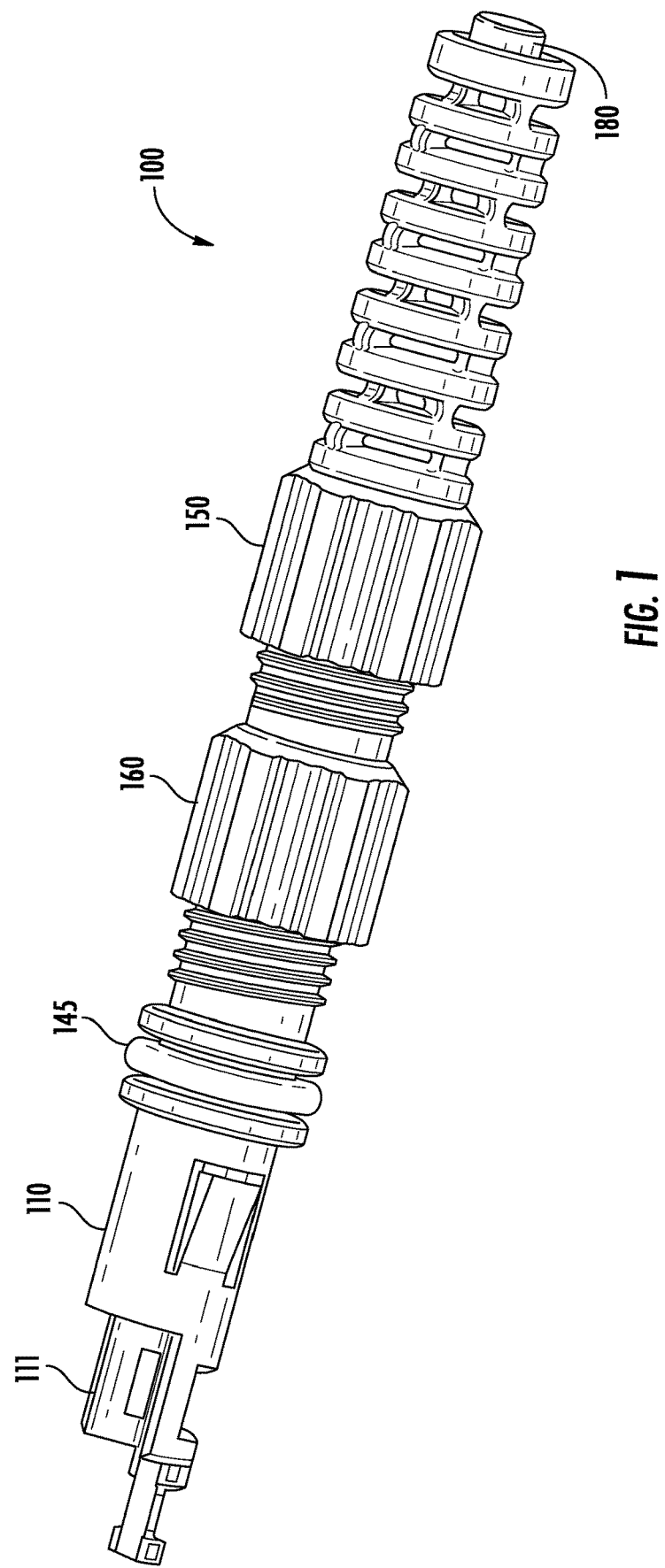
FIG. 1 is an isometric view of an assembled cable entry sealing system in accordance with embodiments disclosed herein.

Various exemplary embodiments of the disclosure will now be described with particular reference to the drawings.

Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the features and limitations set forth in the claims and any equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

For the purposes of describing and defining the subject matter of the disclosure it is noted that the terms "substantially" and "generally" may be utilized herein to represent the inherent degree of uncertainty that may be attributed to any quantitative comparison, value, measurement, or other representation Embodiments of the cable entry sealing systems described above provide user-friendly designs which can greatly facilitate the installation of the last leg of the FTTH network to the end user and prevent the ingress of contaminating particles into telecommunication enclosures. Such cable entry sealing systems are low cost, field-installable, and capable for use with various types of cables, and particularly fiber optic cables—both single fiber and multi-fiber. The cable entry sealing systems disclosed herein also have fewer parts in contrast to conventional systems, and are thus are quicker and simpler to install.

The exemplary cable entry sealing system may be fitted to a communication cable and inserted into a port in a telecommunication enclosure to secure the telecommunication cable in the port. Depending on the communication network architecture, the telecommunication enclosure may be a buried closure, an aerial closure or terminal, a fiber distribution hub or an optical network terminal in the outside plant or a wall mount communication box, fiber distribution hub, a wall mount patch panel, or an optical network terminal in premise applications.

In one exemplary embodiment, the telecommunication cable is a fiber optic cable. The fiber optic cable typically includes a semi-rigid outer sheath surrounding at least one optical fiber and at least one strength member. The optical fibers may be enclosed in one or more loose buffer tubes or may be provided as one or more optical fiber ribbon cables. One to twelve optical fibers may reside in the loose buffer tube surrounded by a water-blocking gel or grease. Each of the ribbon cables may have from one to about twenty-four optical fibers. Each optical fiber has a polymeric coating that surrounds and protects the glass fiber. The optical fiber has a polymeric coating that surrounds and protects the glass fiber. The strength members may be either semi-rigid rods or a collection of loose fibers e.g. made of aramid fibers.

Alternatively, the telecommunication cable may be a low wire count copper cable having a semi-rigid sheath surrounding a plurality of paired copper wires or a copper coax cable.

Figure 2A:
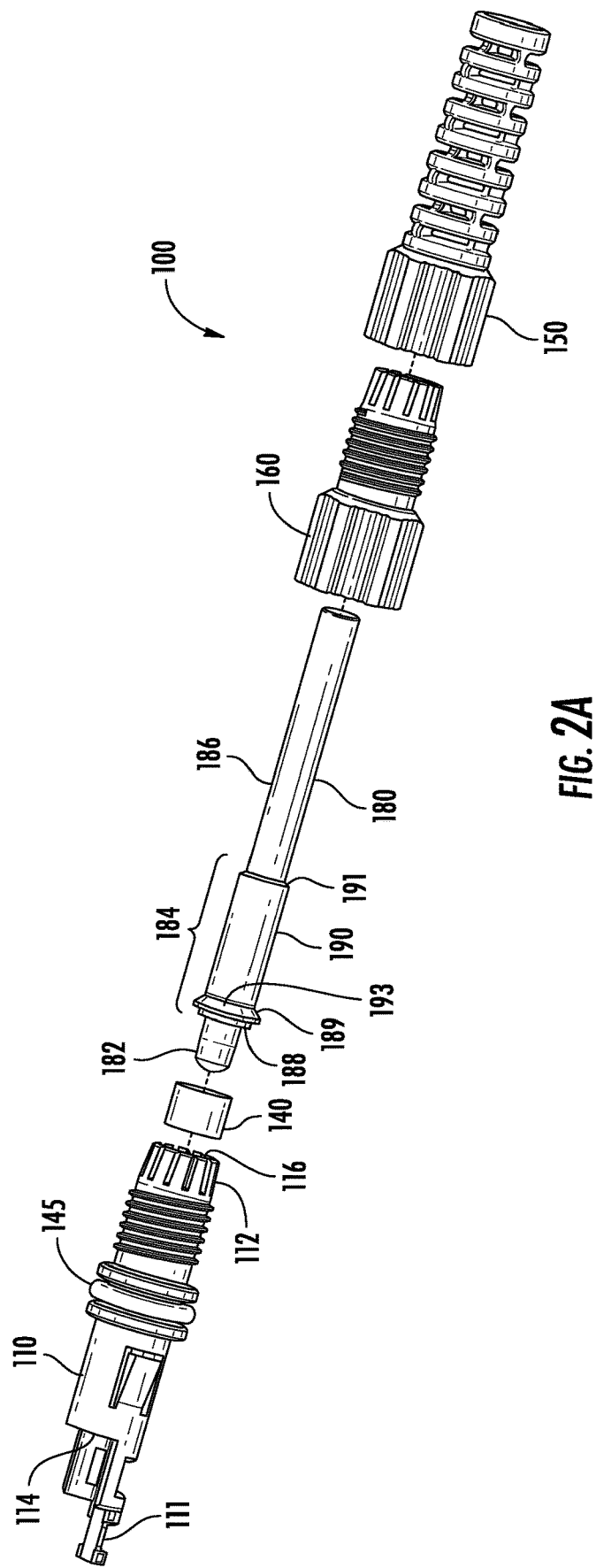
FIG. 2A is an exploded view of the cable entry sealing system shown in FIG. 1.
Figure 2B:
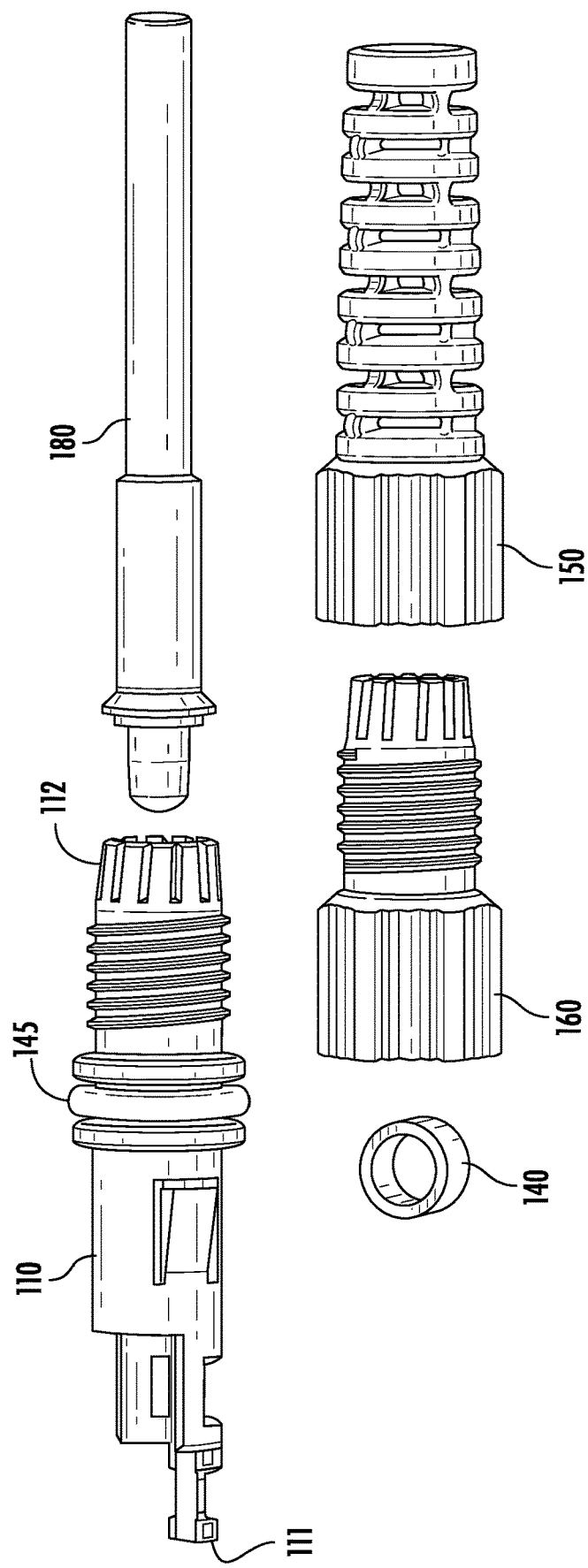
FIG. 2B is a top view of components included in the cable entry sealing system in accordance with embodiments disclosed herein.
Figure 3A:
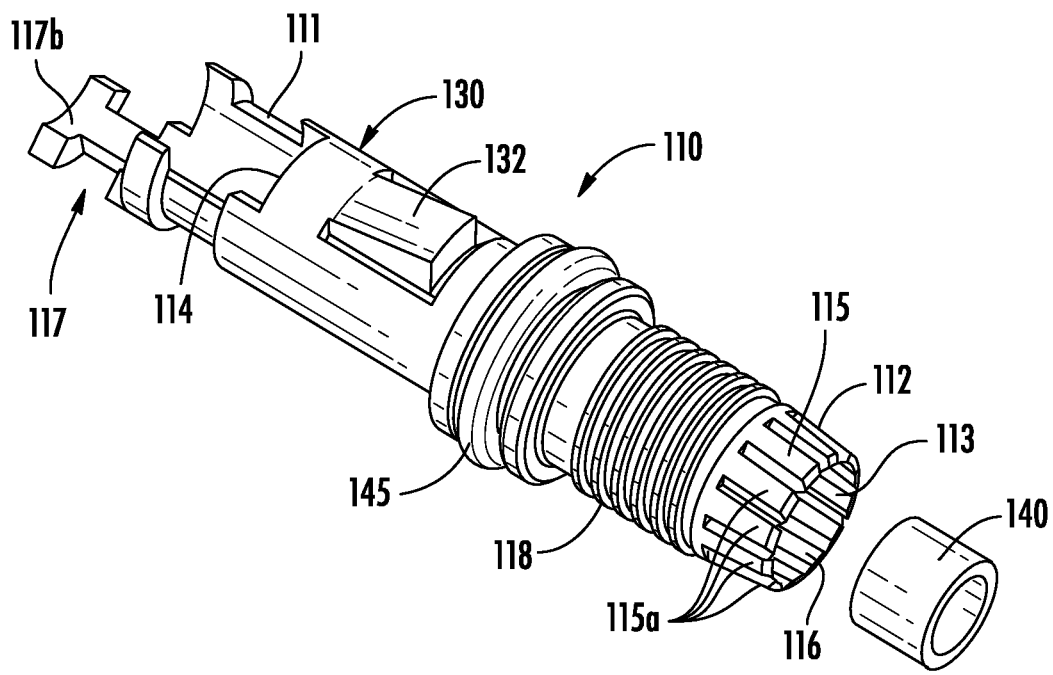
FIG. 3A is a side isometric view of an exemplary housing used in the cable entry sealing system in accordance with embodiment disclosed herein.

FIG. 1 illustrates an assembled cable entry sealing system 100 in accordance with embodiments disclosed herein. The cable entry sealing system 100 includes a housing 110 with an external sealing member 145, at least one compression member, which may be configured as a clamping nut 150 and/or a cable securing device 160, and a sealing and shielding member 180 contained partially within the clamping nut. As shown in FIGS. 2A, 2B, and 3A, the cable entry sealing system 100 additionally includes an internal sealing member 140 shaped to be received within the housing 110. Components of the cable entry sealing system 100 may be formed of plastic by conventional methods, for example by injection molding.

Referring to FIGS. 2A, 2B, and 3A, the housing 110 of the cable entry sealing system 100 also includes a first housing end 111 and a second housing end 112. The housing 110 may be generally cylindrical in shape and includes an interior passageway 113 (FIGS. 3A, 6A-6D) that extends along the length of the housing from the first housing end 111 to the second housing end 112 of the housing. The housing 110 includes a passage entry 114 at the first housing end 111 of the interior passageway and a passage exit 116 at the second housing end 112 of the interior passageway 113 that may be configured to accommodate certain categories of telecommunication cables including single fiber drop cables, multi-fiber cables, copper communication cables or coax cables.

The first housing end 111 of the housing 110 will reside inside the telecommunication enclosure when it has been fully inserted into a port of a telecommunication enclosure. The second housing end 112 may also be located within the port of the telecommunication enclosure when the cable entry sealing system has been fully inserted into a port of a telecommunication enclosure.

At least one compression member is attachable to the second housing end 112, and the sealing and shielding member 180 is configured for insertion into one or more compression members. The compression member may be a cable securing device 160, a clamping nut 150 or a device capable of applying a radial force to the second end of the housing. The at least one compression member may be configured as a cable securing device 160 attached to the second housing end 112 and/or a clamping nut attached to the second end 162 of the cable securing device 160. In an alternative aspect, the cable securing device can be omitted and the compression member includes the clamping nut 150, which directly engages the second end of the housing.

Figure 3B:
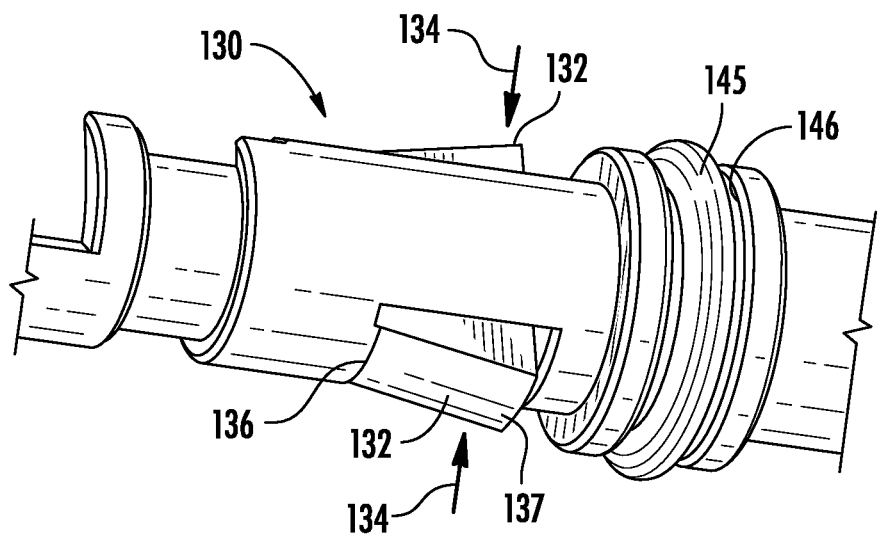
FIG. 3B is a detailed view of a securing zone of the housing shown in FIG. 3A.
Figure 4:
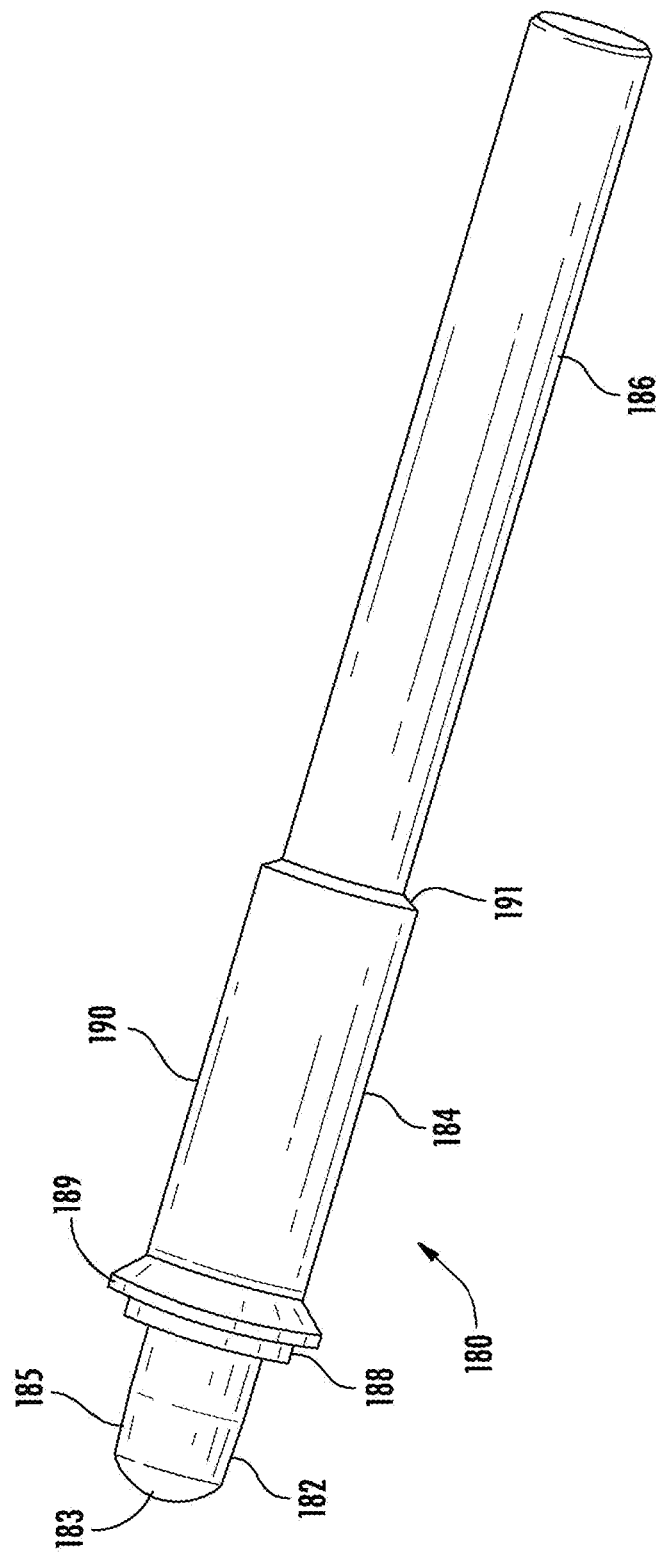
FIG. 4 is a side isometric view of a sealing and shielding member for use in the cable entry sealing system shown in FIGS. 1 and 2A.

As shown in FIG. 3B, the cable retention device 117 may be located adjacent to the first housing end 111 of housing 110. Aramid strength members present in some optical fiber cables may be used to secure a fiber optic cable to the cable retention device 117 by wrapping a length of the aramid strength members around the tie portion 117b and tying them off.

The housing 110 can have a securing zone 130 adjacent to the first housing end 111 of the housing. The securing zone may include one or more locking elements 132 which protrude from the sides of the housing 110. In an exemplary embodiment of the cable entry sealing system, a pair of locking elements disposed on opposite sides of housing, are included and may have a deformable cantilever structure which can flex when depressed.

The cantilever structure can include a free end 137 and an attached end 136. The attached end 136 is connected to the housing 110 and acts as a living hinge for the cantilever structure 132. In an exemplary embodiment shown in FIG. 3B, the free end 137 of the cantilever structures may be depressed by applying an inward radial force 134. When depressed, the free end 137 of the cantilever structures can move into gap 135 formed between the telecommunications cable 50 inside the cable entry sealing system and the cantilever structure 132 such that the cantilever structures do not protrude beyond the external surface of the housing in that region. In this state, the cable entry sealing system may be removed from a close fitting port of a telecommunication enclosure. Thus, after insertion, the locking elements can securely protrude beyond the exterior surface of the housing to lock the cable entry sealing system and provide a close fitting port of a telecommunication enclosure. Further, the cable entry sealing system may be removed from the close fitting port when the cantilever structures are sufficiently depressed.

The cantilever structure 132 may be created by cutting the cantilever structure free of the housing 110 on three sides. Alternatively, the cantilever structure 132 may be created when the housing is formed (e.g. by an injection molding). In an alternative embodiment, the locking elements may be spring loaded and/or have a hinge pin connecting the locking element to the housing of the cable entry sealing system. Alternatively, more than two locking elements may be used. Preferably, the locking elements are spaced evenly around the circumference of the housing. In yet another embodiment, the securing zone may include a receiving channel into which a forked locking device may be inserted to secure the cable entry sealing system into a port of a telecommunication enclosure.

As shown particularly in FIG. 3B, a groove 146 may be located between the securing zone 130 and the second housing end 112 of housing 110 to receive an external sealing member 145 such as an o-ring. This external sealing member can provide an environmental seal between the cable entry sealing system and a port of a telecommunication enclosure when the cable entry sealing system is fully seated therein.

Referring back to FIG. 3A, the housing 110 can have an external threaded portion 118 located between groove 146 and the second housing end 112 of the housing 110. The external threaded portion 118 cooperates with a corresponding internal threaded portion 168, 158 of a compression member (e.g. a cable securing device 160 or a clamping nut 150, respectively) to cause a compressible portion 115 of the housing 110 to conform to an outer surface of the communication cable fitted in the cable entry sealing system.

The compressible portion 115 is formed at the second housing end 112 of the housing. The compressible portion 115 may be reduced in size (diameter) when an external radial force is exerted on it such as by application of a clamping nut 150 or a cable securing device 160. The compressible portion 115 centers the telecommunication cable in the cable entry sealing system 100 when the cable entry sealing system is installed on the telecommunication cable. The compressible portion 115 may include a plurality of spaced apart flexible fingers 115a which surround the passage exit 116. The fingers 115a may be squeezed together when either a cable securing device 160 or clamping nut 150 is attached to the second end of the housing. An optional internal sealing member 140 may be fitted into the interior passageway 113 in the compressible portion 115 of the housing 110 to improve the sealing capability of the cable entry sealing system around a telecommunication cable as may be needed in buried or other subterranean telecommunication enclosure installations.

Upon assembly, the telecommunication cable passes through the internal sealing member 140 when the cable is installed into the cable entry sealing system 100. The tightening of the cable securing device or the clamping nut over the collapsible portion of the housing compresses the internal sealing member. In some applications such as in premise installations, a lesser degree of environmental protection is required and the internal sealing member 140 may be omitted. In this case, the compressible portion of the housing directly grips the cable inserted therethrough.

Figure 6:
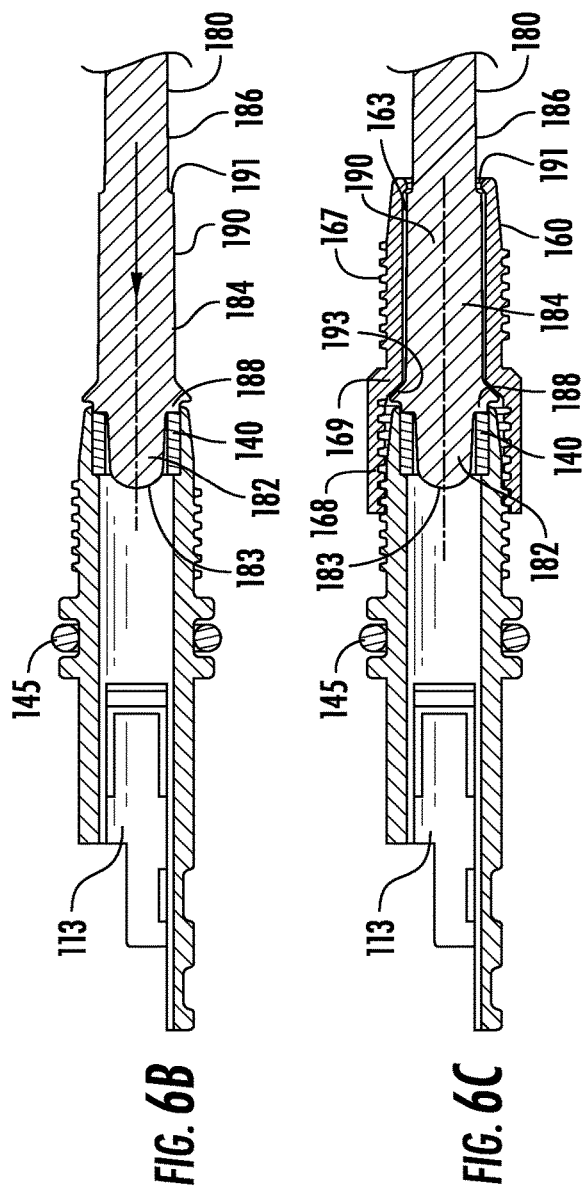
FIGS. 6A-6D are cross-sectional views of the cable entry sealing system at various stages of assembly before pre-installation onto a telecommunication enclosure.

As shown particularly in FIG. 6D, the cable securing device 160 may also be fitted to the second housing end 112 of housing 110. The cable securing device 160 can have an elongated structure with a central bore 163 extending from a first end 161 to a second end 162. The cable securing device can further include an internal threaded portion 168 at the first housing end 111 thereof and an internal inclined wall portion 169 adjacent to the internal threaded portion 168. The internal thread portion 168 can correspond to the external thread on the second end of the housing. The internal inclined wall portion 169 exerts a radial force on the compressible portion 115 of the housing 110 causing the fingers 115a to be pressed closer together to center the cable in the cable entry sealing system. When the collapsible portion is collapsed, squeezing the fingers 115a compresses the internal sealing member 140 against the telecommunication cable, providing an environmental seal around the telecommunication cable while passing through the cable entry sealing system.

Figure 5:
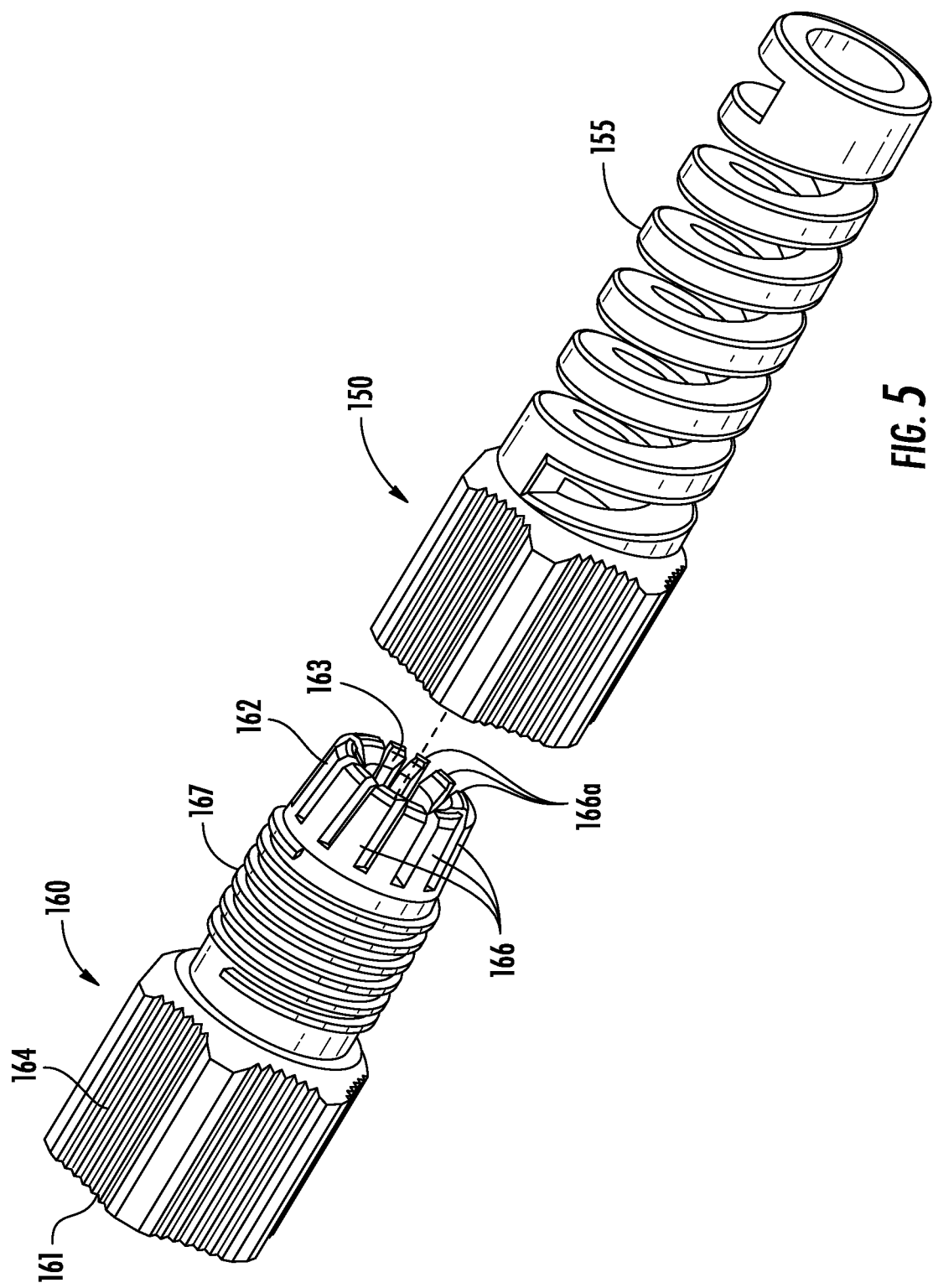
FIG. 5 is an exploded view of a cable securing device and a clamping nut for use in the cable entry sealing systems disclosed herein.

As shown particularly in FIG. 5, in exemplary embodiments, the cable securing device 160 can have a gripping surface 164 on the external surface of the cable securing device that corresponds to the position of the internal threaded portion 168. The external gripping surface may have a hexagonally shaped cross-section to facilitate gripping of the cable securing device with a tool or by hand. The gripping surface region may have other geometric configurations such as a cylindrical shape, a rectangular shape or other polygonal shape. Additionally, the gripping surface may be textured (e.g. a ridged or cross-hatched texture) to further facilitate gripping of the cable securing device.

The cable securing device 160 can have a plurality of spaced apart projections 166 extending from the cable securing device at the second end 162 thereof. Additionally, an external thread 167 may be disposed on the external surface of the cable securing device between the gripping surface 164 and the projections 166.

Each projection 166 may have a barb 166a and/or a plurality of teeth (not shown) disposed near its interior end (i.e. the side of the projection that faces the central bore). The barbs 166a can penetrate the sheath of a telecommunication cable when a clamping nut 150 is secured to the second end 162 of the cable securing device 160. The clamping nut exerts a radial force on the spaced apart projections 166 pushing them inward and pushing the barbs 166a into sheath of the telecommunications cable.

Figure 8A:
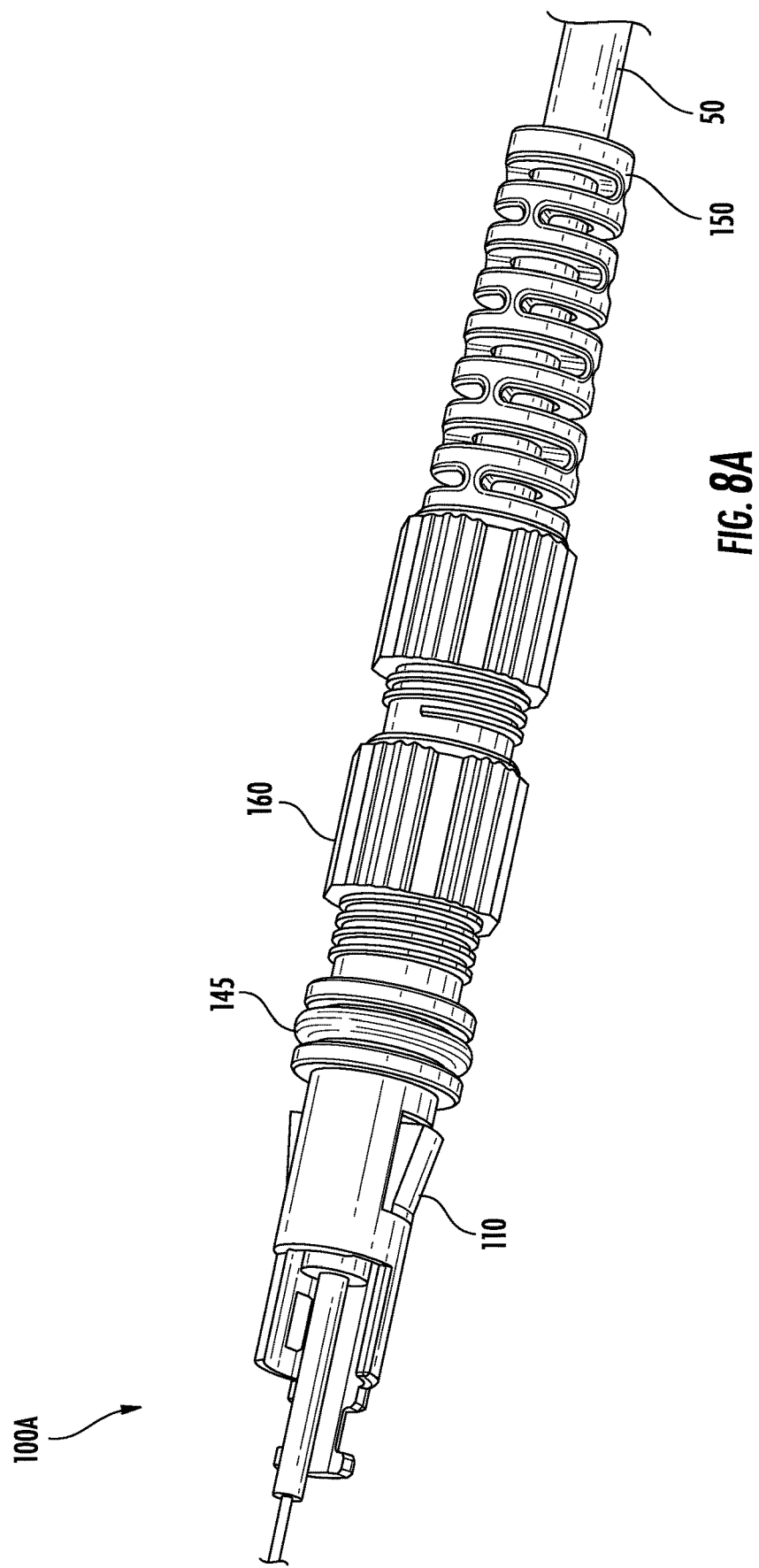
FIG. 8A is a side isometric view of the cable entry sealing system, shown in FIGS. 1 and 2A, with an exemplary cable inserted therein.
Figure 8B:
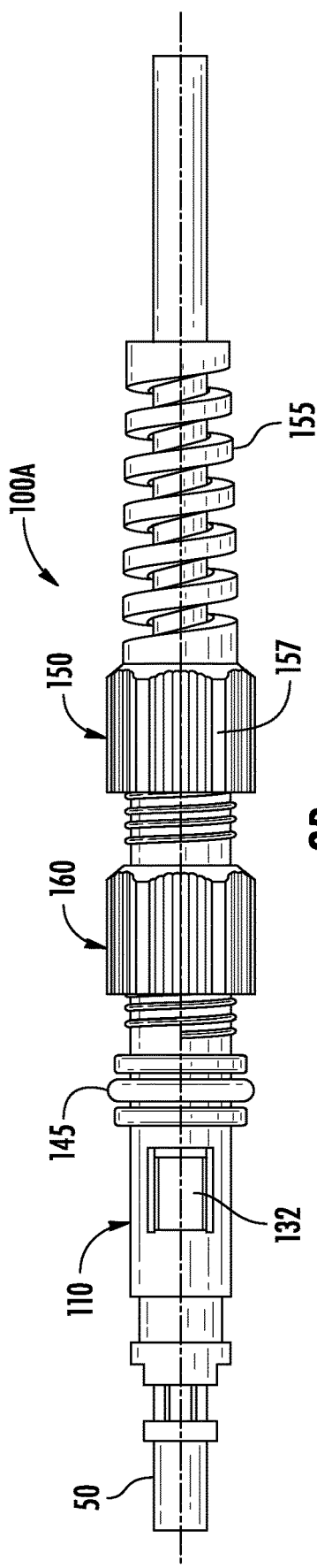
FIG. 8B is a SIDE view of the cable entry sealing system with an exemplary cable inserted therein.
Figure 8C:
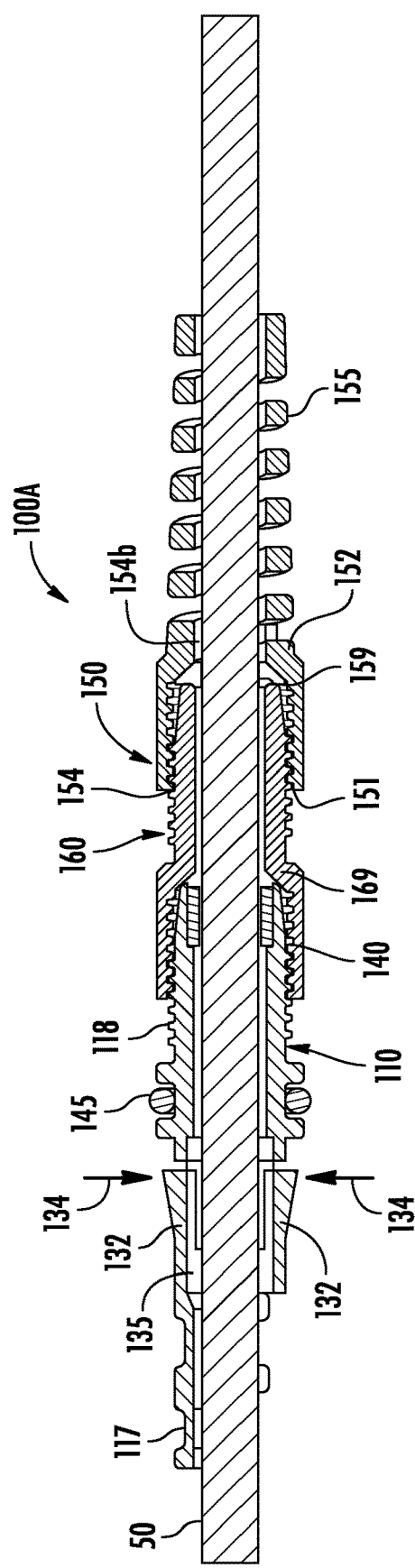
FIG. 8C is a cross-sectional view of the cable entry sealing system shown in FIG. 8B.

The structure of the clamping nut 150 will be described with respect to FIGS. 8B and 8C. The clamping nut 150 has an interior chamber 153 extending between a first end 151 and a second end 152 of the clamping nut. The interior chamber 153 has a first opening 154 at the first end 151 to accept the second housing end 112 of housing 110 and/or the second end 162 of cable securing device 160. The interior chamber 153 has a smaller second opening 159 at the second end 152 of the clamping nut 150 to accommodate the passage of the sealing and shielding member 180 (FIG. 1) or a telecommunication cable 50 (FIG. 8C). The interior chamber 153 has an internal threaded portion 158 that can correspond to the external thread on the second end of the housing and/or the second end of the cable securing device to allow the cable clamping nut to be secured to the housing and/or the cable securing device. The clamping nut 150 also includes an integral bend control boot 155 disposed on the second end 152 of the clamping nut. The bend control boot prevents a telecommunication cable from exceeding its minimum bend radius which could result in degradation of the signal being carried on the telecommunication cable.

The structure of the sealing and shielding member 180 will be described with particular reference to FIGS. 4, and 6B-6D. In this embodiment, the sealing and shielding member 180 includes a plug portion 182, a medial sealing portion 184, and an end sealing portion 186, which are preferably manufactured as one integrated component. The plug portion 182 is insertable into the internal sealing member 140 and preferably has a rounded first end 183 that facilitates insertion into the internal sealing member 140. The plug portion also has an outer diameter 185 sized to fit within an innermost diameter of the internal sealing member 140. The medial sealing portion 184 extends from the plug portion 182 and includes a first raised edge 188 adjacent to the plug portion 182, a lip sealing portion 189 that extends outwardly from the first raised edge, a medial body 190, and a second raised edge 191.

The lip sealing portion 189 preferably has a contoured outer surface 193 that is complementary to the internal inclined wall portion 169 of the cable securing device 160, as shown particularly in FIGS. 6C and 6D.

The overall structure of the sealing and shielding member 180 acts to provide sealing, and protect internal components of the cable entry sealing system from damage due to contaminants such as dirt and gravel.

The overall shape of the sealing and shielding member is also preferably complementary to the interior shape of the cable securing device and the clamping nut 150, as shown in FIGS. 6C and 6D.

Figure 7:
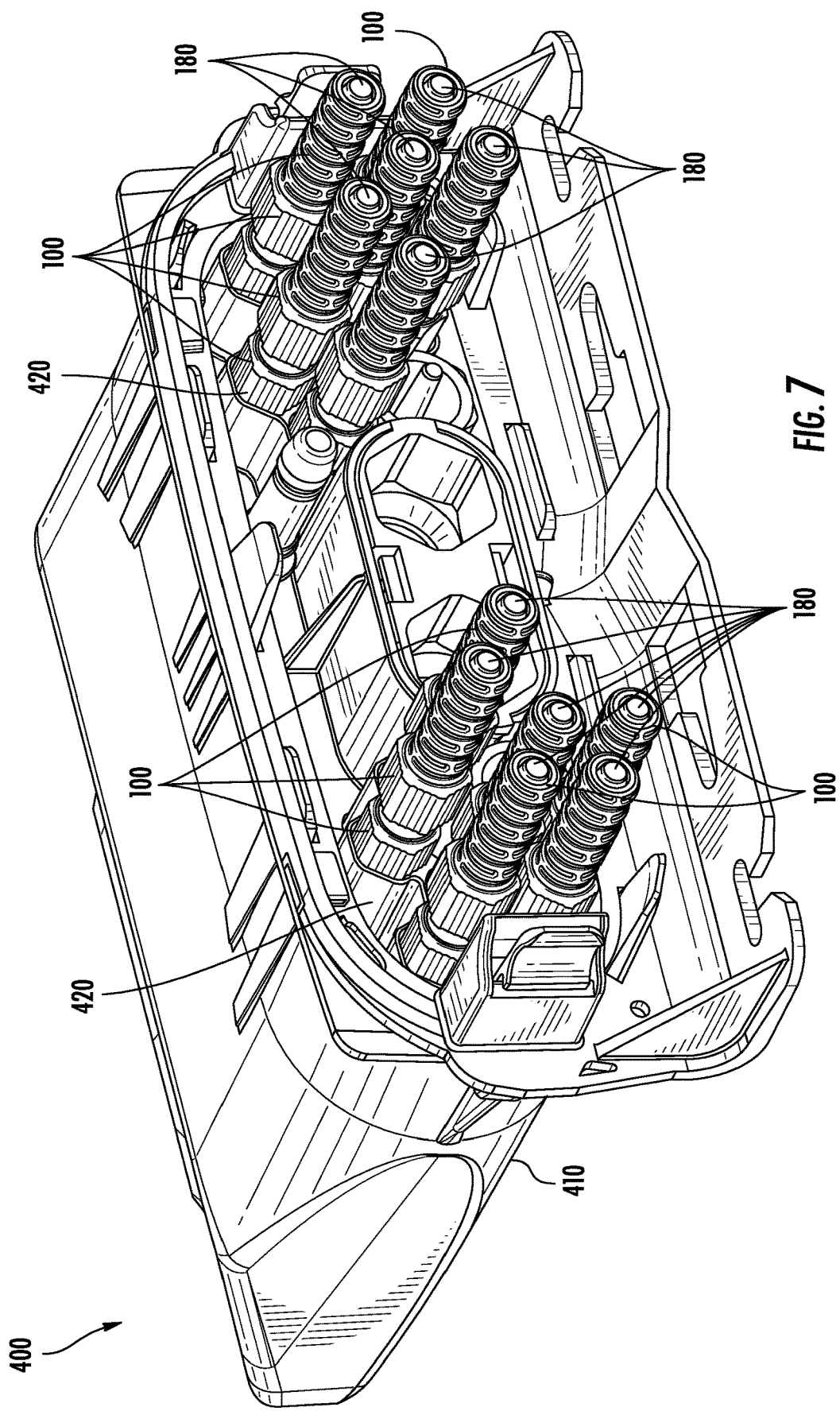
FIG. 7 is a front isometric view of an exemplary telecommunication enclosure for use with the cable entry sealing systems disclosed herein.

An exemplary telecommunication enclosure 400 according to one embodiment is illustrated in FIG. 7. The closure 400 includes a base 410 and a cover or housing (not shown) removably securable to the base. The base 410 includes at least one port 420 for receiving the cable entry sealing system 100. The base 410 may have one, two, or any other number ports 420 as required for a particular application. In the embodiment shown in FIG. 7, the ports 420 are disposed in a hexagonal close packing arrangement which is made possible by the geometry of the inlet device. This arrangement allows for more ports to be accommodated in a smaller amount of space, thus possibly increasing the capacity of the terminal closure. When the ports are designed to accommodate an inlet device having a hexagonal cable securing device and/or clamping nut, the port structure can resemble a honeycomb. The cover may be secured to the base 410 by a nail, clamps or other mechanical fastening method. When engaged, the base and cover provide protection for the internal components of the terminal closure 400 from weather, insects and other external hazards.

The exemplary cable entry sealing systems described herein may also be installed in an optical network terminal (ONT), which can be located on the side of a customer's home or other premises. ONTs convert an optical signal into conventional electrical signals to provide voice (telephone), Internet (data) and video signals to the end user in a hybrid communication network.

In premises applications, such as insertion of cables into junction boxes within a building, an cable entry sealing system may have reduced environmental sealing requirements. In these instances, a cable entry sealing system having a reduced axial length can be used such that the fingers in the compressible portion of the housing may have barbs or teeth as described above for the cable securing device 160. Thus, for such applications, an exemplary cable entry sealing system with locking elements as described above can omit the cable securing device and the internal sealing member resulting in a more compact cable entry sealing system structure.

Various modifications to the systems described herein are contemplated, including extending the use of these systems to applications with copper telecommunication cables or copper coax cables, equivalent processes, as well as numerous structures to which the inventions may be applicable will be readily apparent to those of skill in the art to which the present invention is directed upon review of the present specification.

Moreover, it will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A cable entry sealing system, comprising:
   a housing, having a first housing end and a second housing end;
   a sealing and shielding member having a portion insertable into the housing, the sealing and shielding member comprising:
   a plug portion,
   a medial sealing portion, extending from the plug portion, the medial sealing portion including a first raised edge, a lip sealing portion extending outwardly from the first raised edge, and a medial body section having a second raised edge, and
   an end sealing portion, extending from the medial sealing portion, and
   at least one compression member comprising a cable securing device and a clamping nut, coupled to the end sealing portion, wherein the sealing and shielding member comprises an overall outer shape that is complementary to the interior shape of the cable securing device and the clamping nut; and wherein the sealing and shielding member prevents contamination into the cable entry sealing system and distortion of the at least one compression member.

2. The cable entry sealing system of claim 1, further comprising an internal sealing member, insertable into the second housing end, having an inner diameter, and wherein the internal sealing member is configured to house the plug portion.

3. The cable entry sealing system of claim 1, wherein the housing further comprises a compressible portion at the second housing end.

4. The cable entry sealing system of claim 1, wherein the housing further comprises a securing zone adjacent to the first housing end.

5. The cable entry sealing system of claim 4, wherein the securing zone includes a plurality of locking elements which protrude from opposite sides of the housing.

6. The cable entry sealing system of claim 1, wherein the lip sealing portion comprises an outer surface, which is complementary to an internal inclined wall portion of the cable securing device.

7. A sealing and shielding member for a cable entry sealing system, comprising:
   a plug portion,
   a medial sealing portion, extending from the plug portion, the medial sealing portion including a first raised edge, a lip sealing portion extending outwardly from the first raised edge, and a medial body section having a second raised edge, and
   an end sealing portion, extending from the medial sealing portion,
wherein the sealing and shielding member comprises an overall outer shape that is complementary to the interior shape of at least one compression member, comprising a cable securing device and a clamping nut; and
wherein the sealing and shielding member is configured to prevent contamination into a cable entry sealing system.

8. A telecommunication enclosure, comprising:
   a base having at least one port disposed therein; and
   a cable entry sealing system insertable into the at least one port, the cable entry sealing system, comprising:
      a housing having a first housing end and a second housing end;
      a sealing and shielding member having a portion insertable into the housing, the sealing and shielding member comprising:
         a plug portion,
         a medial sealing portion, extending from the plug portion, the medial sealing portion including a first raised edge, a lip sealing portion extending outwardly from the first raised edge, and a medial body section having a second raised edge, and
         an end sealing portion, extending from the medial sealing portion, and
      at least one compression member, comprising a cable securing device and a clamping nut, coupled to the end sealing portion,
wherein the sealing and shielding member comprises an overall outer shape that is complementary to the interior shape of the cable securing device and the clamping nut; and
wherein the sealing and shielding member prevents contamination into the telecommunication enclosure.

* * * * *